(12) United States Patent
McCauley

(10) Patent No.: US 7,686,276 B1
(45) Date of Patent: Mar. 30, 2010

(54) FISHING ROD AND REEL HOLDER

(76) Inventor: Steven R. McCauley, 1124 Bellemeade La., Charlotte, NC (US) 28270

( * ) Notice: Subject to any disclaimer, the term of this patent is extended or adjusted under 35 U.S.C. 154(b) by 150 days.

(21) Appl. No.: 11/770,132

(22) Filed: Jun. 28, 2007

(51) Int. Cl.
A01K 97/10 (2006.01)
(52) U.S. Cl. .................... 248/535; 43/21.2; 224/922; 248/538
(58) Field of Classification Search ......... 248/519–520, 248/523, 529–530, 535, 538–539; 43/21.2, 43/22, 23, 24; 224/922
See application file for complete search history.

(56) References Cited

U.S. PATENT DOCUMENTS

| | | | |
|---|---|---|---|
| 1,760,592 A | 5/1930 | Gift | |
| 2,682,127 A * | 6/1954 | Binder | 43/21.2 |
| 3,792,829 A | 2/1974 | Fickett | |
| 4,198,775 A * | 4/1980 | Leisner | 43/21.2 |
| 4,245,419 A | 1/1981 | McManus | |
| 4,586,688 A | 5/1986 | Hartman et al. | |
| 4,635,390 A | 1/1987 | Walters | |
| 4,807,384 A | 2/1989 | Roberts, Sr. | |
| 4,827,654 A * | 5/1989 | Roberts | 43/21.2 |
| 5,142,809 A | 9/1992 | O'Brien et al. | |
| 5,184,797 A | 2/1993 | Hurner | |
| 5,231,785 A | 8/1993 | Roberts | |
| 5,313,734 A | 5/1994 | Roberts | |
| 5,437,122 A | 8/1995 | Wilson | |
| 5,460,306 A * | 10/1995 | Rudd | 224/557 |
| 6,089,524 A * | 7/2000 | Lai | 248/535 |
| 6,269,584 B1 | 8/2001 | Peaschek | |
| 6,302,367 B1 | 10/2001 | Ratza et al. | |
| 6,357,166 B1 | 3/2002 | Malmanger et al. | |
| 6,499,248 B2 * | 12/2002 | Thompson | 43/21.2 |
| 6,571,507 B2 * | 6/2003 | Elford | 43/21.2 |
| 6,584,723 B2 * | 7/2003 | Elmore | 43/4.5 |
| 6,802,150 B2 | 10/2004 | Harden | |
| 7,089,699 B2 * | 8/2006 | Borgeat | 43/18.1 CT |
| 7,257,922 B2 * | 8/2007 | Willard | 43/21.2 |
| 7,406,795 B1 * | 8/2008 | Follmar | 43/21.2 |
| 2006/0254118 A1 * | 11/2006 | Warecke | 43/21.2 |
| 2006/0260174 A1 | 11/2006 | Crowe et al. | |
| 2008/0155881 A1 * | 7/2008 | Carnevali | 43/21.2 |

* cited by examiner

Primary Examiner—Amy J Sterling
Assistant Examiner—Tan Le
(74) Attorney, Agent, or Firm—Womble Carlyle Sandridge & Rice, PLLC

(57) ABSTRACT

A holder is provided for a fishing rod and reel combination and comprises a base and a locking mechanism. The base includes opposed side edges, front and rear ends, and a length. A guide is formed in the base and extends a selected distance along the base. The locking mechanism, which is slidably mated to the guide, is shaped and dimensioned to slide within the guide. The locking mechanism includes opposed sides edges and a latch hingedly connected to each of the opposed side edges. The latch is movable between an open position and a closed position. When the latches are moved to the closed position and the locking mechanism is slidably moved within the guide, the locking mechanism is retained in the closed position by the base so that the fishing rod and reel combination cannot be inadvertently removed.

9 Claims, 7 Drawing Sheets

FISHING ROD AND REEL HOLDER

FIELD OF THE INVENTION

The present invention relates generally to the field of holders, supports, and steadying devices, and more particularly, to a fishing rod and reel holder for securing a fishing rod and reel in a desired position.

BACKGROUND OF THE INVENTION

Fishing rod and/or reel holders are used in a variety of fishing applications, and most often are used in situations where the fisherman wishes to continue fishing while not actually holding the rod. In some instances, this is desirable where prolonged holding of the rod would be exhausting, difficult due to physical infirmities, or otherwise awkward. Often also, a fisherman may desire to fish with multiple rods, but cannot hold or control more than one rod at the same time. In another type of fishing known as trolling, a lure and/or bait is pulled along through the water behind a boat in areas where a particular type of fish is targeted. A rod holder is desirable in this application since the effort required to continually hold the rod is substantial.

A number of holders are known for securing a rod and/or reel in a desired position for fishing. Some of these are as simple as open-ended tubes which receive the handle of the rod, while others employ latches, tabs, and locking rings to prevent the rod from being removed inadvertently by a variety of conditions that are common to fishing. These devices, however, either fail to provide an adequate means of securing both the rod and the reel combination or are constructed so that removal of the rod and/or reed under tension, such as might be encountered upon a strike by a large fish, is difficult, if not impossible.

SUMMARY OF THE INVENTION

Embodiments of the present invention are directed to a fishing rod and reel holder which addresses the problems described herein with prior art holders and retainers. In particular, the embodiments of the fishing rod and reel holder described in greater detail below secure both the rod and reel combination, yet also permit the quick and simple release of the rod and reel under expected fishing/boating conditions.

In one embodiment, the fishing rod and reel holder includes a base having a slidable locking mechanism. The base comprises opposed side edges, front and rear ends, a bottom and an open top. A guide formed in or through the base extends a specified distance along the bottom of the base between the front and rear ends. The locking mechanism is slidably engaged to the guide and is shaped and dimensioned to slide forward or rearward within the guide. The locking mechanism generally has opposed side edges, an open top, and at least one latch that is hingedly connected to at least one of the opposed side edges of the locking mechanism. The latch is movable between an open position and a closed position such that when the latch is moved to a closed position and the locking mechanism is moved forward within the guide, the locking mechanism is situated within the base such that the latch is retained in the closed position.

This and other embodiments described above are exemplary only, and other embodiments and aspects of the invention will become apparent to those skilled in the art after a reading of the following description of these embodiments in combination with the figures.

DETAILED DESCRIPTION

Certain exemplary embodiments of the present invention are described below and illustrated in the attached Figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art, and all such alternate embodiments, modifications and improvements are within the scope of the present invention.

Figure 1A:
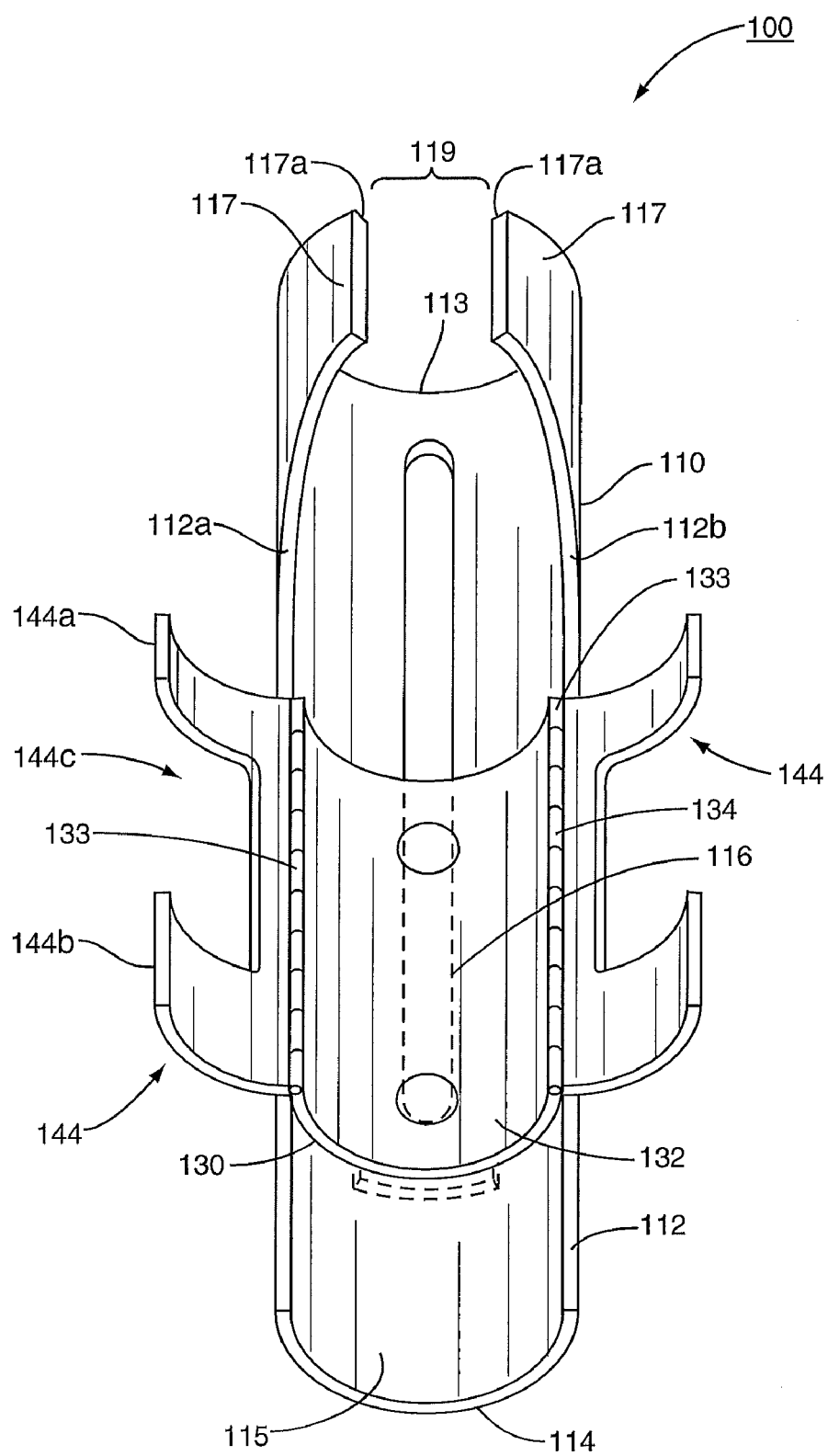
FIGS. 1A and 1B are rear top perspective views of the fishing rod and reel holder of the present invention illustrating the locking mechanism in the unlatched position.
Figure 1B:
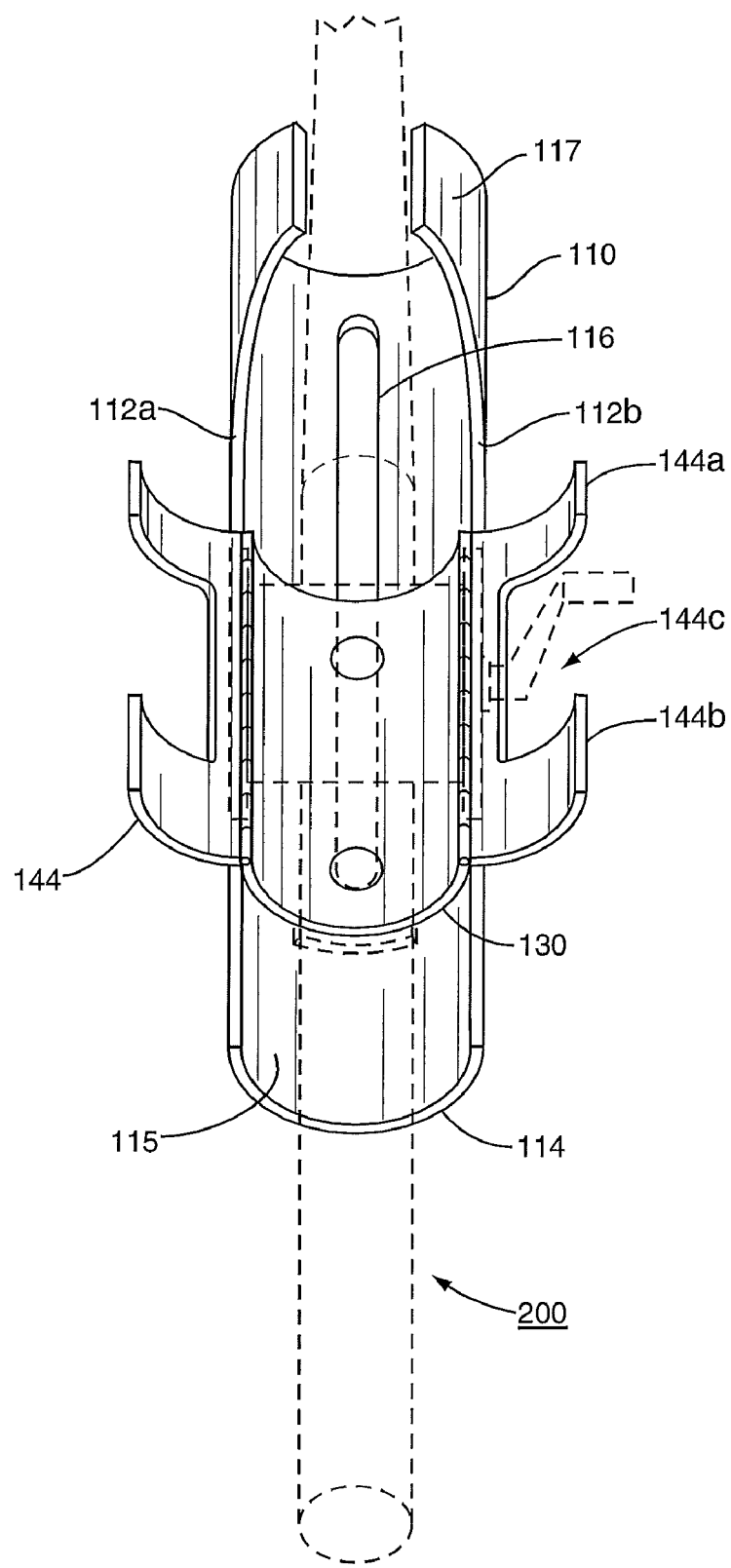

Referring now to the Figures in general, and to FIGS. 1A and 1B in particular, an illustrative embodiment of the present invention is shown as a fishing rod and reel holder, shown generally as 100. As will be understood by those of ordinary skill in the fishing arts, a "rod" refers to the long, slender, cylindrical, and generally flexible member that is usually made of bamboo, steel, or fiberglass, for use with a reel and line in catching fish. "Reel" refers to the device that is affixed to the rod for winding and unwinding a fishing line (not shown) that is that normally attached to and wound about the reel.

Figure 5:
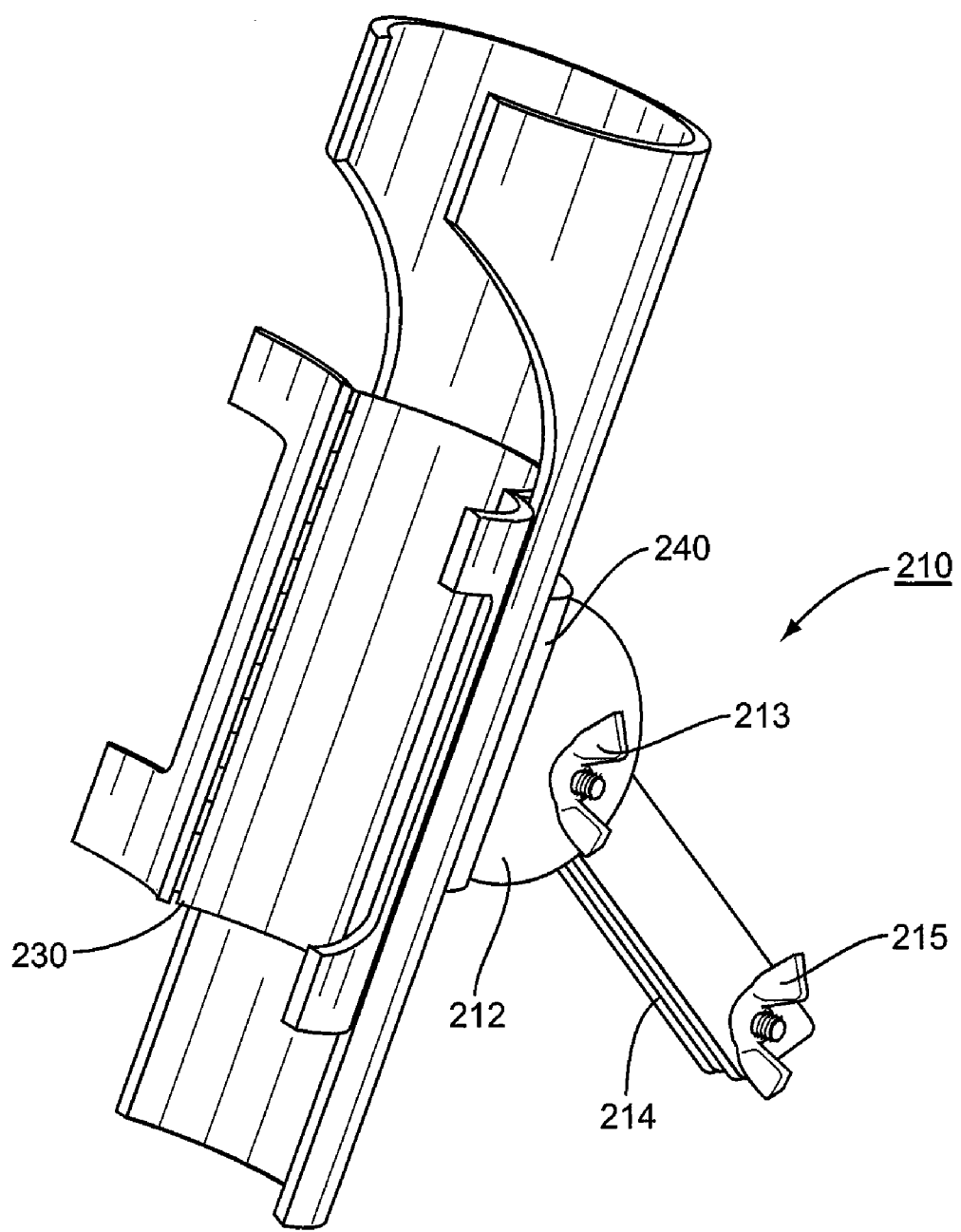
FIG. 5 is a side view of an alternative embodiment of the holder of the present invention illustrating an exemplary clamping arrangement.
Figure 6:
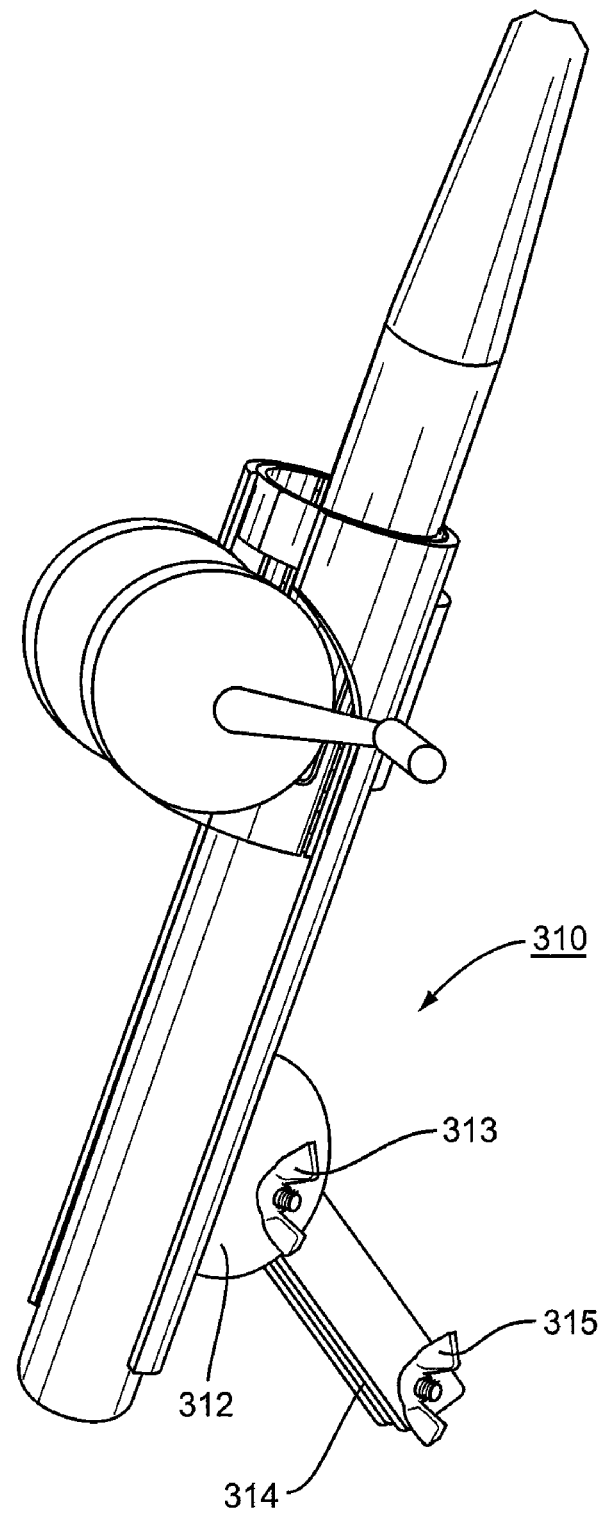
FIG. 6 is a side view of a second alternative embodiment of the holder of the present invention illustrating an alternative clamping arrangement.

As will be described below, FIGS. 1 through 4 illustrate the construction and operation of the fishing rod and reel holder 100 in three different operational positions. In each of FIGS. 1A, 2 and 3, the reel holder is shown apart from a fishing rod and reel 200; however, to better understand the invention, an environmental view is shown in FIG. 1B, and FIGS. 5 and 6, to illustrate the relative placement of a fishing rod and reel 200 (shown in dashed lines), and in the embodiments of FIGS. 5 and 6.

As shown in the Figures, the holder 100 in its simplest form comprises a base 110, and a locking mechanism 130 that is slidably attached to the base 110. In the embodiment shown in FIGS. 1 through 3, the base 110 is formed as a rigid, elongated, arcuate-shaped or semi-circular piece and may be formed from any suitable lightweight, durable, and rigid material. While the embodiments shown and described herein have arcuate geometries, it will be understood that the construction of the device 100 is not limited thereto; rather, other shapes may also be considered for the suitable construction of the device 100 so long as the overall construction satisfactorily holds and secures fishing rods and reels. The base 110 and locking mechanism 130 may be formed from a durable plastic or metal, or other suitable materials, which may be molded, extruded/pultruded, and cut or shaped to produce the semicircular, open base shown.

The base 110 comprises opposed side edges 112a and 112b, front and rear ends 113, 114, a bottom 115, and an open top. A pair of opposed retainers 117 extended upwardly and arcuately inward from the opposed side edges 112 at the front end 113 of the base, the retainers 117 terminating in free edges 117a. The retainers 117 may be integrally formed with the base 110 or may be separately attached to the opposed side edges 112. As shown in the Figures, a gap 119 between the free edges 117a is sufficiently dimensioned to receive the diameter of the rod portion of a fishing rod and reel 200. The gap facilitates placement of the fishing rod and reel combination 200 within the holder 100.

A longitudinally extending slot 116, or guide, is cut out of the bottom 115 of the base 110. The locking mechanism 130 is slidably mounted to the base 110 through the guide 116. As best shown in FIG. 1, the locking mechanism 130 is also elongate and shaped and dimensioned to slide within the base 110. The locking mechanism 130 may be formed of a rigid material similar to that used to form the base and may have an outside diameter that is approximately the same as the inside diameter of the base 110. The locking mechanism comprises a cradle 132 having opposed side edges 133, and opposed latches 144 that are hingedly connected to each of the opposed side edges 133 with hinge pins 134, or alternatively with separately attached hinges. The length of the cradle 132, and hence the length of the locking mechanism 130, as shown in the Figures, may be shorter than the length of the base 110 so that the cradle has sufficient sliding distance between the unlocked position illustrated in FIGS. 1A and 1B and the locked position illustrated in FIGS. 3A and 3B, without extending beyond the front 113 and rear ends 114 of the base 110. To facilitate the operation of the holder 100, the opposed side edges 133 of the cradle 132 extend arcuately upward from the bottom of the cradle 132 to a height that is substantially the same height as the opposed side edges 112 of the base 110. Latches are hingedly connected to some or the entire length of each opposed side edge 133 of the cradle 132. The latches 144 may be interconnected to the opposed side edges 133 by a separately attached hinge or, alternatively, the opposed sides edges 133 and the edges of the latch may be formed with integral hinged leaves (as shown in the embodiment illustrated herein) that may be interconnected with a common hinge pin; however, the particular construction of the hinges is not critical or limiting to the holder 100 of the present invention. Further, the hinged characteristics of the latches 144 may be integrally molded with the locking mechanism 130 whereby a thinner flexible link is provided between the latches 144 and the opposed side edges 133.

Each latch 144 comprises a pair of arcuate-shaped fingers 144a, 144b separated longitudinally and defining a slot 144c therebetween. The slots 144c for the opposed latches 144 are cooperatively dimensioned to receive the reel portion of a fishing rod and reel combination when the reel is rested within the cradle 132, as shown in FIGS. 1A, 5, and 6. When the latches 144 are pivoted inwardly to a latched position (FIG. 2) about the reel, the free edges of the fingers 144a, 144b generally meet at the apex of the locking mechanism 130, thus securing the reel in position and limiting the longitudinal movement of the rod and reel combination 200.

Figure 3:
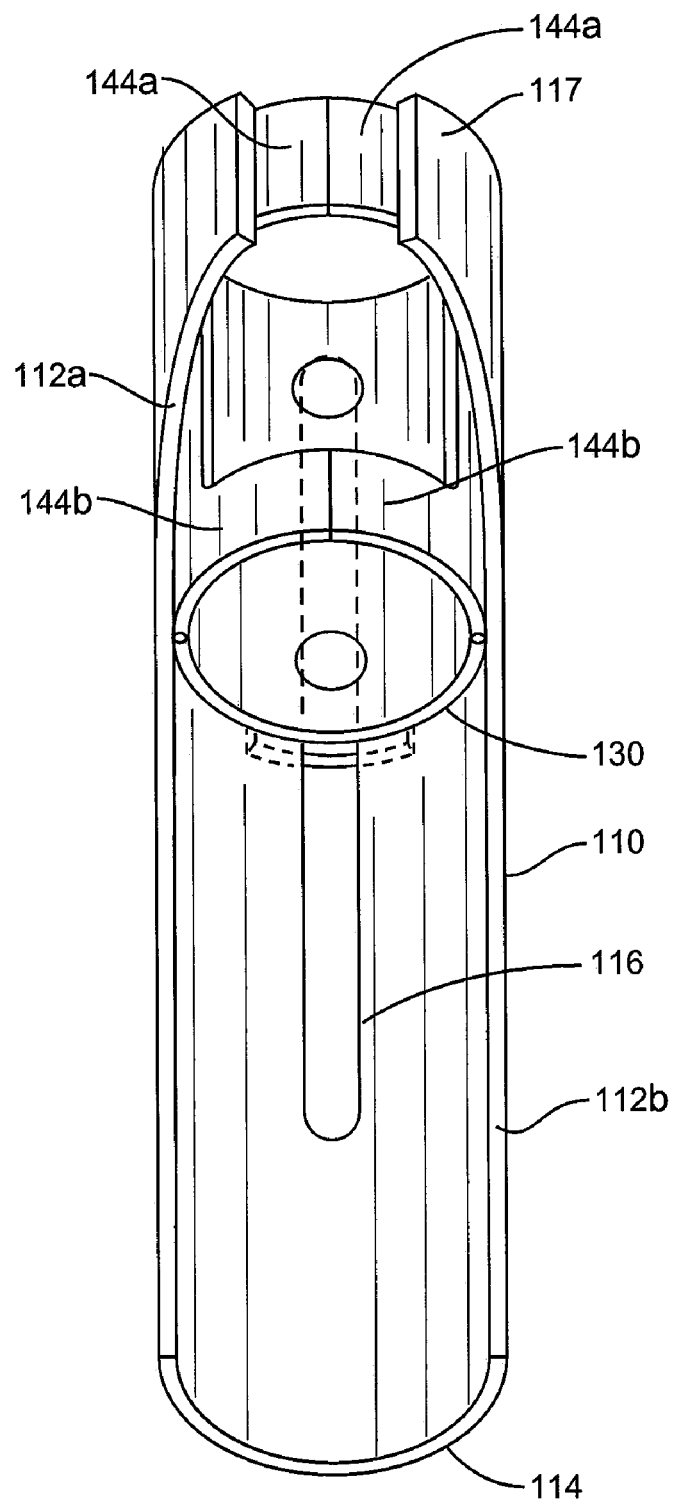
FIG. 3 is a rear top perspective view of the fishing rod and reel holder of the present invention illustrating the locking mechanism in the latched and engaged position.
Figure 4:
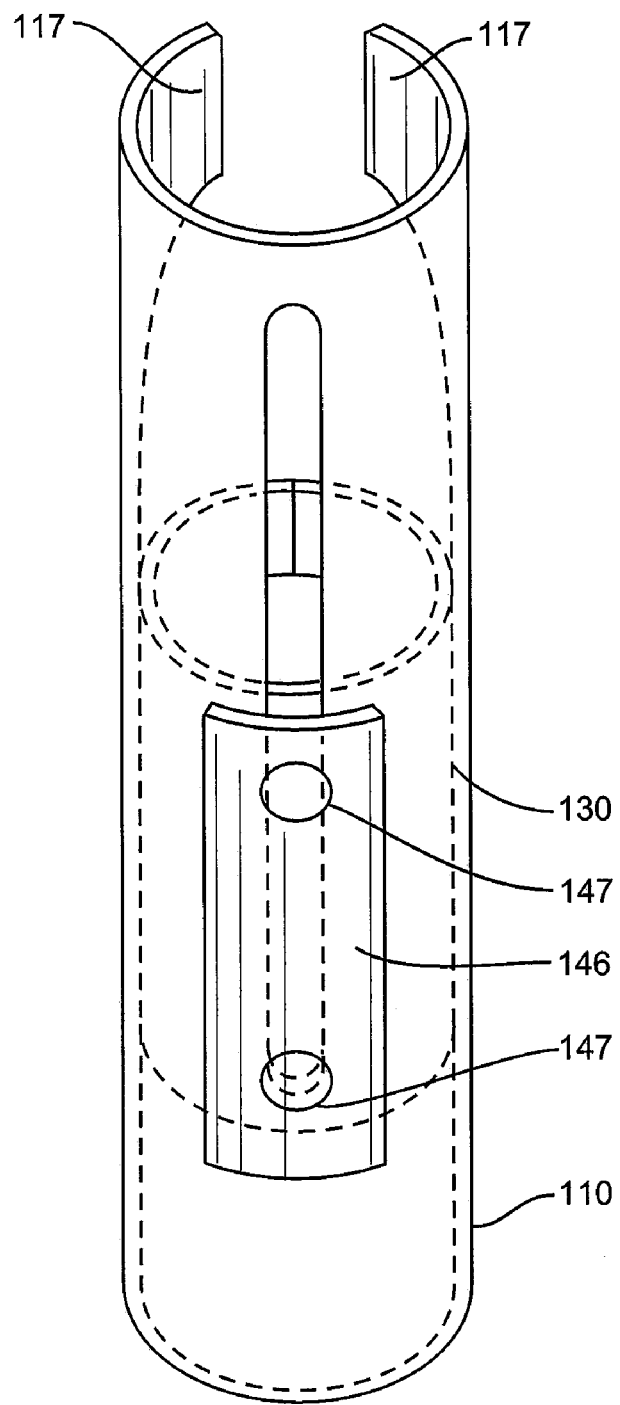
FIG. 4 is front bottom perspective view of the holder of the present invention.

Referring now to FIGS. 3 and 4, the cooperative interconnection between the locking mechanism 130 and the base 110 is shown. As shown in the Figures, a plate 146 is positioned against the outer bottom surface of the base 110 and connected through the slot 116 to the cradle 132 of the locking mechanism 130 with suitable fasteners 147. In the embodiment shown, the fasteners 147 may comprise a plurality of bolts, screw, or rivets. As will be appreciated, the cradle 132 and plate 146 are so interconnected that both the cradle 132 and the plate 146 are permitted to slide longitudinally against the inner and outer surfaces, respectively, of the base. As will also be appreciated, the cradle 132 and plate 146 may be interconnected so that they frictionally engage the inner and outer surfaces of the base 110 when slid longitudinally so that the cradle 132 remains in a desired position during the during use of the holder 100.

Figure 2:
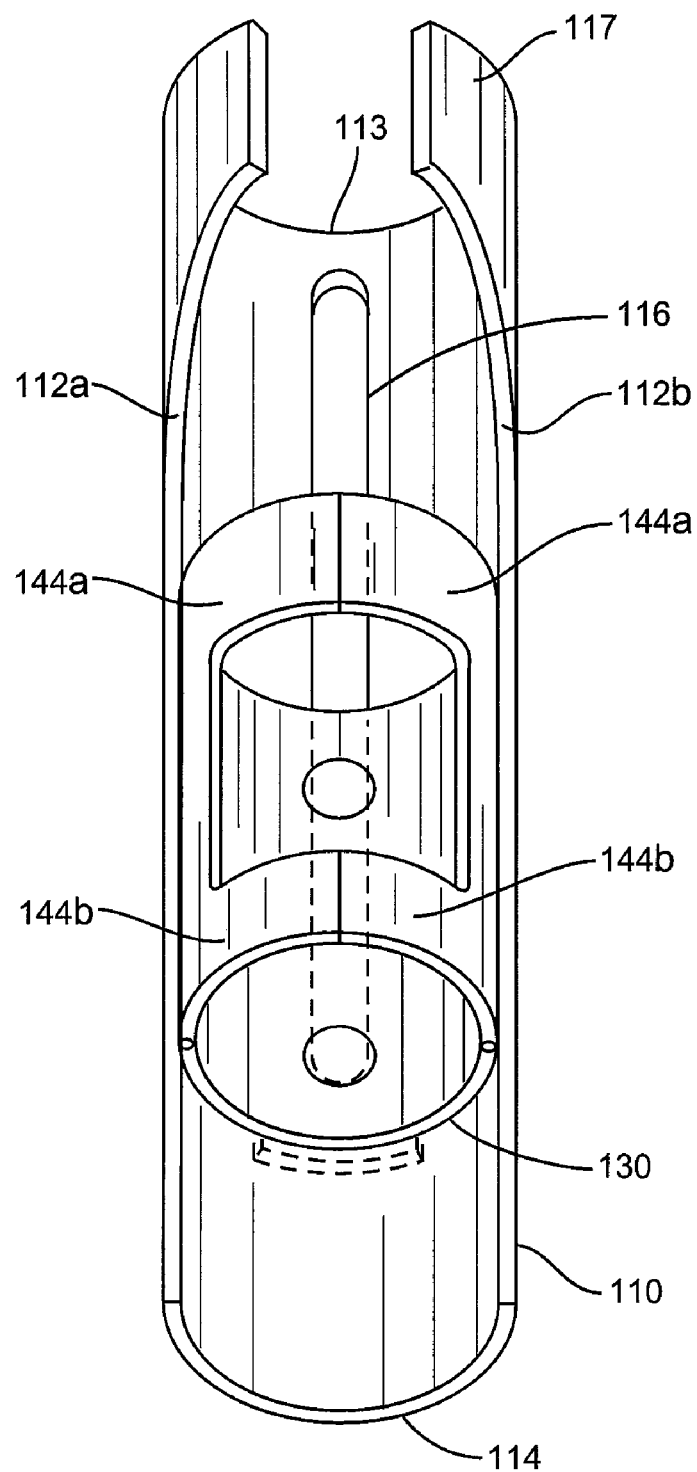
FIG. 2 is a rear top perspective view of the fishing rod and reel holder of the present invention illustrating the locking mechanism in the latched position.

In operation, with the holder 100 positioned as shown in FIGS. 1A and 1B, a user may place the rod and reel combination 200 with the rod extending longitudinally along the length of the base 110 and with the reel resting in the cradle 132. The user next pivots the latches 144 to the closed, latched position shown in FIG. 2. As shown in FIG. 2, the free ends of the fingers 144a, 144b of the opposed latches 144 meet generally at the apex of the locking mechanism 130. With the latches 144 closed, the user may slide the locking mechanism 130 forward (or rearward where the retainers 117 are at the rear end 114 of the base 110) until the fingers 144a at the front of the latch are positioned beneath the opposed retainers 117 at the front end of the base 110, as shown in FIG. 3. With the latches 144 constructed as described herein, when fingers 144a are engaged by the retainers 117, fingers 144b are also prevented from opening.

In one embodiment, the base 110 with retainers 117, and locking mechanism 130 with fingers 144a may be dimensioned so that the fingers 144a will frictionally engage the undersurfaces of the retainers 117. This frictional engagement would prevent the locking mechanism 130 from inadvertently sliding out of position due to movement of the structure/vessel to which the holder 100 is attached or due to forces on the rod and reel attributable to the strike of a fish or pressure on the tackle.

Alternatively, the fishing rod and reel holder 100 of the present invention may be constructed such that the retainers 117 on the base 110 are located at the rear end of the base 110 instead of at the front end. Thus, the locking mechanism 130 in that embodiment would be slid rearwardly for locking engagement of the fingers 144b with the retainers 117. Also, alternatively, the base 110 may comprise both forward and rear retainers so that the user may selectively slide the locking mechanism 130 either forwardly or rearwardly for equivalent locking engagement.

Turning lastly to FIGS. 5 and 6, an optional, but further, aspect of the fishing rod and reel holder of the present invention is the manner in which the holder may be secured to a structure or vessel while in use. As shown in FIG. 5, an alternative embodiment of the holder comprises a multi-position clamping mechanism 210. The clamping mechanism 210 may be attached to the holder via the bottom plate 240 so that the clamping mechanism 210 slides forwardly or rearwardly with the locking mechanism 230. In the exemplary embodiment shown in FIG. 5, the clamping mechanism 210 comprises a hub 212 which directly attaches to the plate 240. Pivotally attached to the hub 212 with a releasably adjustable fastener 213 is a pair of clamping members 214 which may comprise rectangular bars of rigid material that are spaced apart from each other by a spacer (not shown) so that the bars will sufficiently fit around a structural member such as a round or polygonal post or rail. The adjustable fastener 213 may comprise a threaded bolt and wingnut or other suitable adjustable fastening arrangement. The free ends of the clamping members are further joined together by a second adjustable fastener 215 such as another threaded bolt and wingnut.

The hub 212 and clamping member 214 are formed of a suitably rigid and durable material such as PVC or other plastic or a metal that may withstand the repeated stresses of attachment and use anticipated for a fishing rod and reel holder of the type described herein.

Turning lastly to FIG. 6, a second exemplary clamping mechanism 310 is shown for a fishing rod and reel holder. This embodiment of the clamping mechanism 310 is substantially the same as the clamping mechanism shown in FIG. 5 and comprises a hub 312 which directly attaches to the base. Pivotally attached to the hub 312 with a releasably adjustable fastener 313 is a pair of clamping members 314. The free ends of the clamping members 314 are similarly joined together by a second adjustable fastener 315. Whereas the clamping mechanism 210 shown in FIG. 5 is slidably movable with the plate 240, the clamping mechanism illustrated in FIG. 6 is fixed to the base 310 apart from the plate.

It will be understood by those skilled in the art that while the foregoing has been described with reference to preferred embodiments and features, various modifications, variations, changes and additions can be made thereto without departing from the spirit and scope of the invention.

I claim:

1. A holder for a fishing rod and reel combination, comprising:
    (a) a base, having:
        (i) opposed side edges, front and rear ends, and a length;
        (ii) a pair of retainers extending inwardly from each of the opposed side edges of the base, each retainer having a free end;
        (iii) a slot formed in the base and extending a selected distance along the base;
    (b) a locking mechanism slidably mounted to the base through the slot, the locking mechanism shaped and dimensioned to slide within the base and having:
        (i) opposed side edges;
        (ii) a latch hingedly connected to each of the opposed side edges of the locking mechanism, the latches movable between an open position and a closed position; and
    (c) the at least one retainer adapted for locking engagement with the latches of the locking mechanism in the closed position wherein when the latches are closed, and the locking mechanism is moved forward within the guide, the retainers on the base will engage the latches on the locking mechanism, thereby preventing the latches from opening.

2. The holder of claim 1 wherein the base is arcuate-shaped.

3. The holder of claim 1 wherein the base is formed of a rigid polymeric material.

4. The holder of claim 1 wherein the guide comprises a slot formed along the bottom of the base.

5. The holder of claim 1 wherein a gap is formed between the free ends of the retainers.

6. The holder of claim 1 wherein each of the latches has opposed ends, an arcuate-shaped finger at each end having a free end, wherein the fingers define a slot therebetween dimensioned to receive the reel portion of the fishing rod.

7. The holder of claim 6 wherein when closed, the free edges of the fingers meet at an apex of the locking mechanism when the latches are in the closed position.

8. The holder of claim 1 wherein when the at least one latch is moved to the closed position and the locking mechanism is slidably moved within the guide, the locking mechanism frictionally engages the base.

9. The holder of claim 1 further comprising a clamping mechanism, comprising:
    (a) a hub extending outward from the base; and
    (b) at least one clamping member depending from the hub.

* * * * *